ROBERT ARDREY.
Improvement in Cutters for Molding Stone, &c.
No. 127,011.  Patented May 21, 1872.
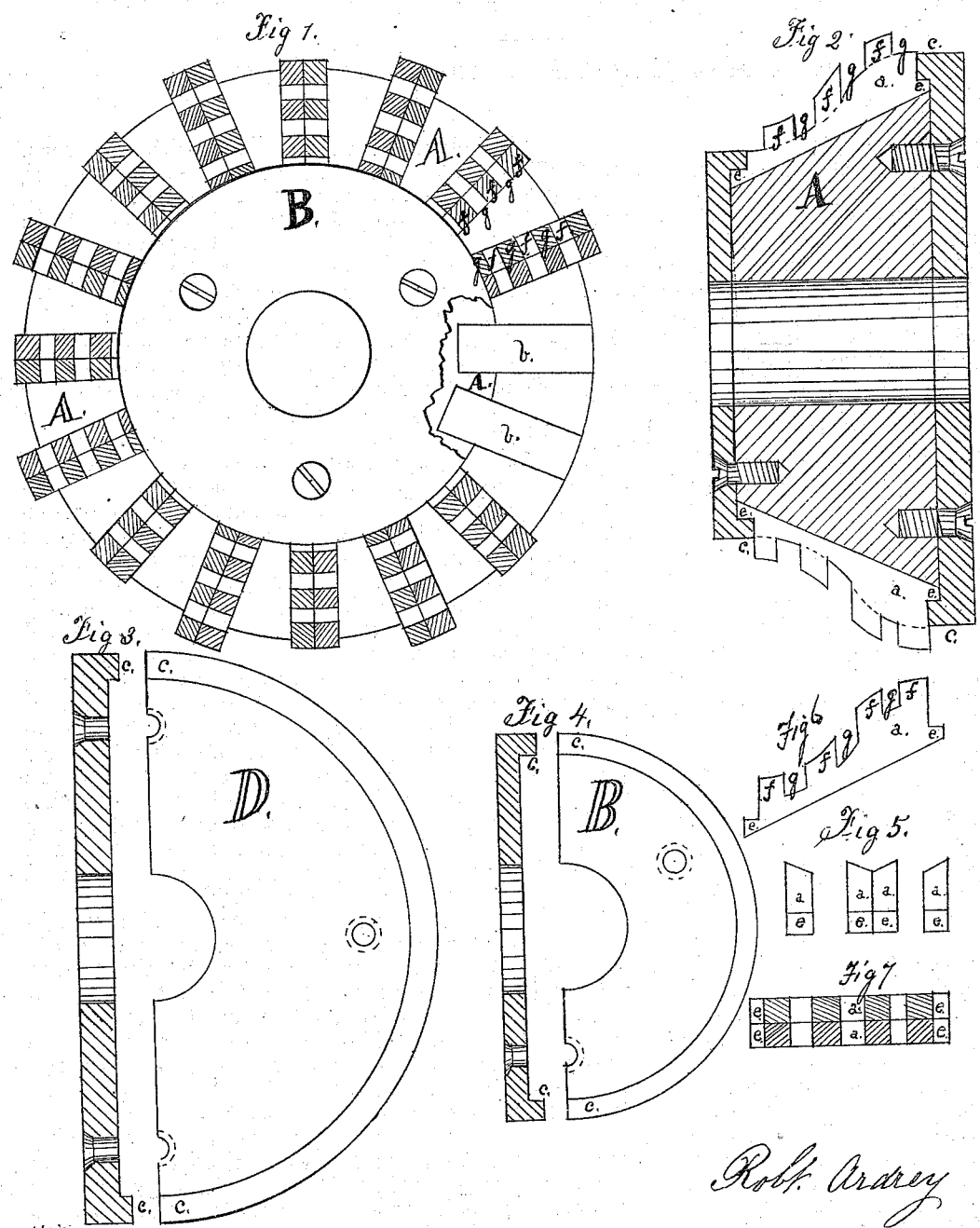

UNITED STATES PATENT OFFICE.

ROBERT ARDREY, OF FRANKFORD, PENNSYLVANIA, ASSIGNOR TO HIMSELF, ROBERT PILKINTON, AND JAMES KELLY.

IMPROVEMENT IN ROTARY CUTTERS FOR MOLDING STONE, &c.

Specification forming part of Letters Patent No. 127,011, dated May 21, 1872.

*To all whom it may concern:*

Be it known that I, ROBERT ARDREY, of Frankford, in the county of Philadelphia and State of Pennsylvania, have invented certain new and useful Improvements in Rotary Cutters for cutting and molding marble and slate, soap, sand, and other stones; and I further declare that the following, taken in connection with the drawing forming part hereof, is such a full, clear, and exact description thereof as will enable others skilled in the art to make and use the same.

The object of this invention is to produce a rotary cutting and molding machine, which, while it is simple in construction, is efficient in operation, and easily kept in repair; and the invention consists in forming the knives or cutters in two longitudinal pieces, and in forming in them indentations or notches, so that each knife appears to be made up of a number of smaller knives, chisels, or teeth, $a$ $a$, and in the method of fastening the knives to the central hub by plates and shoulders, and further in the combination together of the various parts in the complete machine, all as hereinafter set forth.

In the drawing, Figure 1 represents a top view of the complete machine, a portion of the top plate being broken away and two knives removed to show the slots upon the hub in which the knives are secured. Fig. 2 is a cross-section of Fig. 1. Figs. 3 and 4 are views of the top and bottom plates. Figs. 5, 6, and 7 are views of the knives.

Each knife, $a$ $a$, is composed of two pieces, the edges longitudinally being formed to correspond with the edge or molding desired to be produced; transversely they are beveled as cutting instruments usually are, the bevels on the two pieces forming one knife, one on the outer edges, as shown in Fig. 5, so that the knife cuts in either direction. Notches or depressions of suitable form are cut into the edges of the knives as at $g$, Figs. 1, 2, and 6, leaving teeth $f$ having the double cutting-edges described. These teeth should be slightly larger than the indentations, spaces, or parts cut out. If the knife was one long cutting-surface, it would simply scrape the material away, but by being thus cut up as it were with a number of chisels, the teeth act in a chipping or rasping manner, and speedily make a clear and smooth cut or molding the shape of the knife. Each end of the knives is provided with a projection, $e$, forming a shoulder with the body of the knife, for use as hereafter described.

These knives are fixed into a hub or body, A, of wrought or cast-iron or other suitable material. This hub roughly approximates the shape of the molding, being cylindrical for straight cutters or beveled for ogee or other waving moldings, as seen in Fig. 2. On the outer edge recesses or slots are formed at suitable distances apart, trued and finished, to receive exactly the back edge for a suitable distance of a knife of two pieces. These recesses may be plain, as shown, or may be beveled, so that they are narrowest at the outer edge, the knives having beveled shoulders at the back so as to slide in, and be held by the beveled shoulders. Into these recesses the knives are placed, the two pieces forming one knife, being slid in together. The different knives are arranged so that the teeth in one knife are opposite the spaces in the knife adjoining. By this means all parts of the marble or stone are equally acted on. The teeth being somewhat larger than the spaces between them the whole face is cut. The knives are held firmly and prevented from slipping out by the top and bottom plates B and D, attached to the hub A.

These plates are made somewhat larger in diameter than the ends of the hub they are to fit on, having upon their inner sides a projecting rim, $c$, cast or made around the outer edge, and are fastened to the hub by screws or other fastenings. The knives being placed in the recesses, these plates are fastened on the rim $c$, fitting in the space $e$ at the end of each knife, holding them firm in their place.

For repairing or sharpening, one plate being removed, the knives can be removed, and sharpened if need be, which is easily done, the knives being in two pieces. On being replaced, the plate is fastened down. The cutter can be mounted upon any suitable spindle, and driven by any suitable power.

Having thus described my invention, what

I claim as new, and desire to secure by Letters Patent, is—

1. The knives of a rotary cutter formed of two pieces, substantially as and for the purpose herein described.

2. The knives of a rotary cutter indented or formed with teeth and blank spaces, substantially as and for the purpose herein described.

3. The knives of a rotary cutter formed with shoulders $e$, substantially as and for the purpose herein described.

4. In a rotary cutter, the binding plates B and D, having projecting rim $c$, substantially as and for the purpose herein described.

5. The combination of the hub A, plates B and D, and knives, substantially as and for the purpose herein described.

ROBERT ARDREY.

Witnesses:
    JOHN MARLOR,
    JOHN SHINN.